United States Patent

[11] 3,575,520

[72] Inventor William Halpern
 Harrison, N.Y.
[21] Appl. No. 816,204
[22] Filed Apr. 15, 1969
[45] Patented Apr. 20, 1971

[54] ROTARY CUTTING TOOL AND AUXILIARY TOOL ELEMENT AND MEANS FOR INTERCONNECTING SAME
 9 Claims, 5 Drawing Figs.
[52] U.S. Cl. .................................................. 408/191,
 145/123, 145/125
[51] Int. Cl. ..................................................... B23b 51/08
[50] Field of Search .......................................... 77/66, 65,
 73.5; 145/123, 125, 126, 128; 29/(Inquired)

[56] References Cited
UNITED STATES PATENTS
563,584 7/1896 Foster .......................... 145/125
417,486 12/1889 Isabel .......................... 145/125

Primary Examiner—Francis S. Husar
Attorney—Curtis, Morris & Safford

ABSTRACT: A tool is disclosed for drilling a hole, and as an adjunct thereto for performing an additional function such as chamfering or deburring. The tool is formed by a standard drill or reamer and an auxiliary tool element which may be adjusted to act when the drill or reamer has reached a predetermined depth in the workpiece. A special locking arrangement is provided for securing the auxiliary tool in the adjusted position. The auxiliary tool also performs the very important additional function of supporting and guiding the drill through a drill jig bushing.

PATENTED APR 20 1971 3,575,520
Fig.1 Fig.2 Fig.4 Fig.3 Fig.5
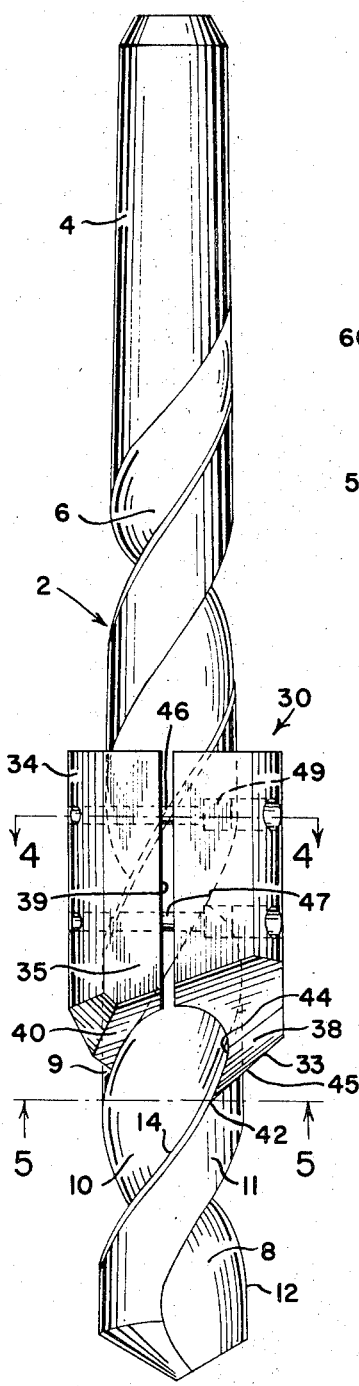
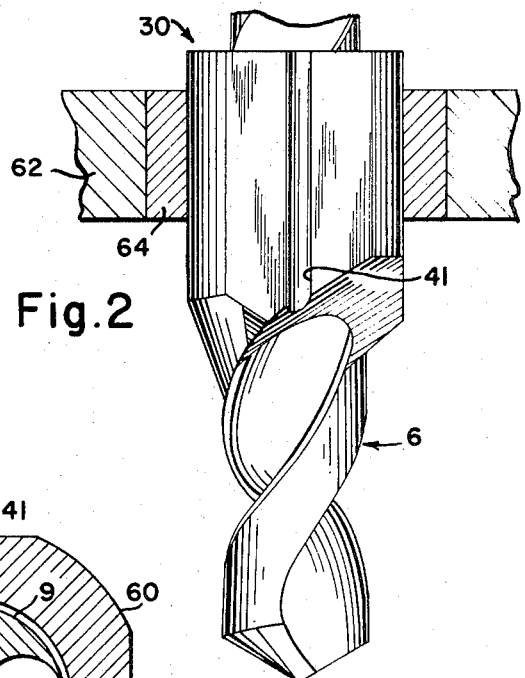
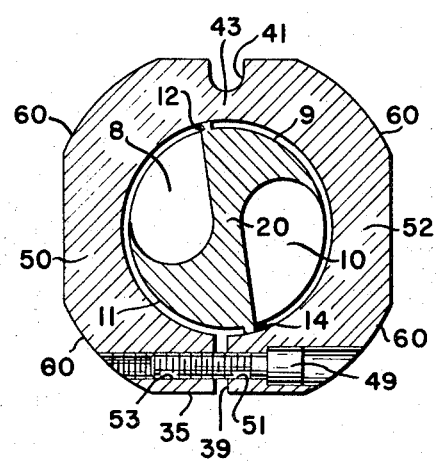
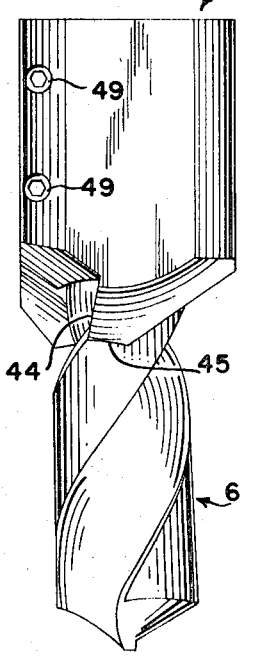
INVENTOR.
William Halpern
BY
Curtis, Morris & Safford
ATTORNEYS

ROTARY CUTTING TOOL AND AUXILIARY TOOL ELEMENT AND MEANS FOR INTERCONNECTING SAME

This invention relates to improved means to perform a function such as drilling or reaming, and as an adjunct thereto to perform additional functions such as chamfering, deburring and the like. More particularly, the invention relates to apparatus for drilling a workpiece and chamfering or deburring the hole.

An object of this invention is to provide a simple and dependable means for carrying on a chamfering or other operation as an adjunct to drilling a workpiece. A further object is to provide new and improved means for securing an auxiliary tool element to a drill so as to permit the operator to drill a hole and perform an additional function such as chamfering the hole. Another object is to provide an efficient and dependable means for adjustably securing an auxiliary tool element to a precision twist drill or similar tools having flutes. A further object is to provide an improved guide and support unit for twist drills and the like. These and other objects will be in part obvious and in part pointed out below.

In the drawing:

FIG. 1 is a side elevation of one embodiment of the invention;

FIGS. 2 and 3 are views respectively from the rear and right-hand side of FIG. 1; and FIGS. 4 and 5 are enlarged sectional views on the lines 4—4 and 5—5 respectively of FIG. 1.

Referring to FIG. 1 of the drawing, a drill 2 has a shank 4 and a drill body 6, with two spiral flutes 8 and 10 (see also FIGS. 4 and 5) therein separated by the clearance diameter portion of spiral lands 9 and 11. Two cutting edges 12 and 14 extend respectively along the leading edges of lands 9 and 11, respectively, and hence along the trailing edges of the two flutes. Adjacent cutting edge 12, there is a margin 16, and adjacent cutting edge 14 there is an identical margin 18. As shown best in FIGS. 4 and 5, the two flutes are separated along the axis of the drill by a web 20.

Rigidly mounted upon drill 2 is an auxiliary tool or chamfering unit 30 which is a precision-ground block of tool steel having a lower chamfering portion 33 with a central bore 37, and the upper body portion 34 with a central bore 36. Bore 36 is formed with a radius which is slightly greater than the radius of margins 16 and 18, and bore 37 is formed with a radius which is slightly greater than the radius of lands 9 and 11. Chamfering portion 33 is formed by a tool element or a chamfering lip 38 along land 11, and a portion 40 positioned oppositely thereto, along land 9. Lip 38 terminates at a pointed tip 42, and extending from it are a spiral cutting edge 44 and a bottom edge 45. Unit 30 is positioned on drill 2 with tip 42 in trailing relationship with respect to margin 14 and with the tip and bottom edge 45 positioned on the surface of land 11. Cutting edge 44 extends from the surface of land 11 upwardly and radially outwardly directly behind margin 14. Hence, when the drill is drilling a hole in a workpiece, the chamfering lip trails the margin so as to chamfer the top of the hole.

Sidewall 35 of unit 30 is cut through to bores 33 and 37 so as to form a vertical slot 39 which is aligned with the bore axis and has parallel coextensive side faces. Unit 30 also has on its side opposite slot 39 a shallow slot or groove 41, the center plane of which is in substantial alignment with the bore axis and slot 39. Slot 41 reduces the wall thickness to provide between it and bore 33 a slightly flexible or spring web 43 which interconnects the two sides or half-portions 50 and 52 of unit 30 and permits them to be moved toward each other at slot 39.

Extending transversely of slot 30 are two clamping screws 46 and 47 each of which has a recessed head 49 and extends therefrom through a smooth bore 51 in half-portion 52, and thence is threaded into a threaded bore 53 at the left in half-portion 50. Hence, screws 46 and 47 may be tightened to flex web 43 and move the two half-portions 50 and 52 toward each other from the normal rest position. Slot 39 is of sufficient width to permit the half-portions to swing in against the opposite sides of the drill and thereby clamp unit 30 in a fixed position upon the drill. Hence, web 43 acts somewhat as a rigid spring hinge and, when the screws are loosened, the half-portions return to their rest position away from the clamping relationship with respect to the drill.

Drill 2 and unit 30 are of the general type described in my prior U.S. Pat. No. 3,044,325. However, in the tool of that patent, that unit is resiliently mounted to move spirally around the drill; whereas, in accordance with the present invention, when unit 30 is in use it is rigidly clamped and locked to the drill. Screws 46 and 47 and body portion 34 perform the function of securing unit 30 in the selected position on the drill. Prior attempts have been made to mount an auxiliary tool element rigidly along the flutes of drills. However, the surfaces of the flutes and lands of such drills and the like are necessarily very hard and smooth so that a set screw cannot be used to clamp a tool element in place. Such clamping is also difficult because the fluted length of the drill is slightly tapered away from the tip or point end, i.e., it is of slightly lessening diameter in the direction away from the tip or point end. In the tool of the illustrative embodiment, the prior difficulties have been overcome. Unit 30 may be adjusted to any selected position along drill 2, and when screws 46 and 47 have been tightened, unit 30 is securely locked in place and will not slide along the drill even when subjected to pressures which are normally excessive.

As indicated above, bore 36 has an original radius which is slightly greater than that of margins 16 and 18, and bore 37 has a radius which is slightly greater than lands 9 and 11. Hence, during assembly, screws 46 and 47 are loosened so that the two half-portions of unit 30 spring apart and the bores have their original radii. Unit 30 is then slipped onto the tip end of the drill with chamfering lip 38 in alignment with the lower end of land 11 and with portion 40 in alignment with land 9. The unit is then moved upwardly on the drill around the spiral of the lands to the desired location and point 44 is positioned, as shown, in trailing relationship to margin 18. Screw 46 is then tightened so as to clamp the upper portion of unit 30 in fixed position on the drill. Screw 47 is then tightened so as to clamp the lower portion of the unit onto the drill and press the inner surfaces of lip 38 and portion 40 (bore 37) respectively against lands 11 and 9. With screws 46 and 47 thus tightened, the half-portions of unit 30 clamp tightly in against margins 16 and 18 (see FIG. 4). These margins are spirals upon opposite sides of the drill and present extended surfaces which are substantially parallel to the surface of bore 36. At the bottom of the drill (FIG. 5), the surfaces of bore 37 are held against lands 9 and 11 to provide further surface contact between unit 30 and drill 2. Hence, the compression forces are exerted over extended margin and land surfaces so as to avoid excessive stress, and produce a reliable friction-clamping relationship. Also, that relationship between the drill and the bottom edges of lip 38 and portion 40 prevents chip particles from becoming wedged between the drill surfaces and unit 30.

In producing a chamfered hole with the tool of the illustrative embodiment, the drill is used in the usual manner to produce the desired hole in the workpiece, and unit 30 is positioned on the drill so that the final movement of the drilling stroke causes unit 30 to chamfer the top of the hole. Unit 30 may be adjusted to a new position by loosening screws 46 and 47, moving the unit along the drill to the new position, and then tightening the screws again. Unit 30 may also be used for deburring the hole at the end of the drilling operation. The cutting edge 42 is sharpened simultaneously with the sharpening of the drill by moving unit 30 to the end of the drill and locking it in place.

Unit 30 also performs the functions of a slip-removable bushing to guide and support the drill, e.g., in a drill bushing in a jig or templet. That additional function is made possible by clamping unit 30 to drill 2 and then grinding the external corner surfaces 60 of the unit 30 to the contour of the cylindrical surface, whereby the axes of that surface and the drill are precisely the same. When clamped onto the drill, the walls of unit 30 are drawn in against the drill so that bore 36 has the back-taper of the drill. Therefore, by grinding the corner surfaces 60 of unit 30 when clamped to the drill its internal bore is slightly tapered and its corner surfaces 60 are along a true cylinder, so that the walls of unit 30 are slightly thicker at the top than at the bottom. Therefore, unit 30 has the important additional characteristic that its surfaces 60 provide a guide for the drill in the workpiece which is more precise than a slip-removable bushing. During use with unit 30 clamped to a drill, the corner surfaces 60 are presented to the internal surface of a drill bushing and provide a very precise guide in the jig plate in which the drill bushing is mounted. With that mode of operation, a space is provided for the discharge of chips above the workpiece and below the jig or templet.

Such a use is shown in FIG. 2 where a drill jig 62 and drill bushing 64 are shown oriented with respect to unit 30. Because the radiused corner surfaces 60 form a true cylinder, the unit 30 is free to rotate within the drill bushing 64 while the drill 2 is rotated into a workpiece (not shown).

It is understood that twist drill 2 is illustrative of rotary cutting tools upon which unit 30 is mounted and used for chamfering or deburring, and the invention has special advantages with that use. However, the invention contemplates that the structure for mounting unit 30 on the drill may be used with other auxiliary tool elements and that unit 30 may be used with other rotary cutting tools such as reamers.

As many possible embodiments may be made of the mechanical features of the above invention and as the art herein set forth might be varied in various parts, all without departing from the scope of the invention, it is to be understood that all matter hereinabove set forth, or shown in the accompanying drawings is to be interpreted as illustrative and not in a limiting sense.

I claim:

1. The combination of, a rotary twist drill of the type having a spiral flute and adjacent land surfaces along its axis and having a substantially uniform transverse configuration, an auxiliary tool surrounding said drill and adapted to be moved axially along the flute to a selected position to perform an additional function upon the workpiece as an adjunct to the function produced by said drill, said auxiliary tool having attaching means and tool means integral therewith, said attaching means comprising an integral body portion surrounding said rotary drill and having an integral bore of a radius which is slightly greater than the radius of the margins of said rotary drill, said body portion having a slot extending between said bore and the outer surface and being sufficiently flexible to permit the body portion to be clamped against the margins of the drill, a pair of clamping screws threaded in bores transverse to said slot whereby the tightening of said screws clamps said body portion against the margin surfaces of said drill, said tool means having an internal bore of a radius which is slightly greater than the radius of the lands of said drill whereby the tightening of said screws presses the surfaces of the last-named bore against the adjacent land surfaces of the drill.

2. The combination described in claim 1 wherein said tool means comprises a chamfering lip having a spiral cutting edge which is positioned in trailing relationship to a margin of said drill and said surfaces of said last-named bore are positioned tightly against said lands radially inwardly from said cutting edge.

3. The combination as described in claim 2 wherein said body member has a flexible web in general alignment with said slot and upon the opposite side of the axis of said drill.

4. The combination described in claim 3 wherein said web is formed by a groove in the outer wall of said body member.

5. The combination as described in claim 1 wherein said body portion presents guiding surfaces when clamped to said drill which are along a true cylindrical surface having its axis coincident with the axis of said drill.

6. A chamfering tool for use with a rotating cutting tool which comprises a body portion having a central bore which is of a diameter slightly greater than the maximum diameter of the cutting tool with which it is to be used and having a rectangular slot extending between said bore and an outer side surface of said body portion, a pair of clamping screws bridging said slot transversely thereof and adapted to be tightened to clamp said body portion against the outer surfaces of the cutting tool, and a chamfering portion integral with said body portion and having a bore of slightly lesser radius than that of the first-named bore, said last-named bore presenting surfaces which engage the opposite side surfaces of a drill.

7. A chamfering tool as described in claim 6 wherein said chamfering portion has a chamfering lip which is in trailing relationship with respect to the plane of said slot.

8. A chamfering tool as described in claim 6 wherein said body portion is formed by two half-portions and an interconnecting web positioned at the side of the axis of said bores opposite said slot.

9. A chamfering tool as described in claim 6 for use with a cutting tool which is a twist drill having two spiral lands and wherein said chamfering portion has bore surfaces which rest respectively upon the clearance diameter surfaces of said lands.